(12) United States Patent
Hayafuchi

(10) Patent No.: US 9,278,544 B2
(45) Date of Patent: Mar. 8, 2016

(54) LIQUID DISCHARGING APPARATUS AND LIQUID DISCHARGING METHOD

(71) Applicant: SEIKO EPSON CORPORATION, Tokyo (JP)

(72) Inventor: Yuya Hayafuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/450,595

(22) Filed: Aug. 4, 2014

(65) Prior Publication Data

US 2015/0054875 A1  Feb. 26, 2015

(30) Foreign Application Priority Data

Aug. 23, 2013 (JP) ................................. 2013-173037
Aug. 23, 2013 (JP) ................................. 2013-173038

(51) Int. Cl.

| | |
|---|---|
| *B41J 2/21* | (2006.01) |
| *B41J 3/407* | (2006.01) |
| *B41J 11/00* | (2006.01) |
| *D06P 5/30* | (2006.01) |
| *D06P 1/00* | (2006.01) |
| *G01J 3/50* | (2006.01) |

(52) U.S. Cl.
CPC .............. *B41J 2/2132* (2013.01); *B41J 3/4078* (2013.01); *B41J 11/009* (2013.01); *D06P 1/0032* (2013.01); *D06P 5/30* (2013.01); *G01J 3/50* (2013.01)

(58) Field of Classification Search
CPC .... B41J 11/009; B41J 11/0095; B41J 2/2132; B41J 3/4078; H04N 2201/0471; H04N 2201/04787; D06P 1/0032; D06P 5/30; G01J 3/50

USPC ............. 347/14, 15, 16, 19, 40, 43, 101, 105, 347/106
See application file for complete search history.

(56) References Cited

U.S. PATENT DOCUMENTS

| | | | |
|---|---|---|---|
| 5,774,146 A | 6/1998 | Mizutani | |
| 6,859,291 B1 | 2/2005 | Katoh | |
| 7,104,644 B2* | 9/2006 | Sugaya et al. | ................ 347/107 |
| 7,284,813 B2* | 10/2007 | Otsuki | ............................. 347/19 |
| 8,186,824 B2* | 5/2012 | Fujita | ..................... B41J 11/007 347/101 |
| 2014/0267459 A1* | 9/2014 | Kanai | .......................... 345/690 |

FOREIGN PATENT DOCUMENTS

| | | |
|---|---|---|
| EP | 1457347 A1 | 9/2004 |
| JP | 2000-345463 A | 12/2000 |
| JP | 2004-220063 A | 8/2004 |

OTHER PUBLICATIONS

Extended European Search Report for European Patent Application No. 14181963.1 dated Jan. 20, 2015.

\* cited by examiner

*Primary Examiner* — Thinh Nguyen
(74) *Attorney, Agent, or Firm* — Global IP Counselors, LLP

(57) ABSTRACT

A liquid discharging technique is provided that conveniently carries out recording (printing) with a desired coloring relative to media (fabric or the like) with various characteristics such as an ink color development property. A textile printing apparatus 100 is a liquid discharging apparatus which discharges a liquid (an ink) onto a recording medium (a fabric 1) and records an image and includes a liquid discharging section (a head 41) which discharges the ink onto the fabric 1 based on correction image information which is corrected according to coloring information for the fabric 1 which is obtained from the fabric 1 which is supplied to the textile printing apparatus 100.

8 Claims, 7 Drawing Sheets

LIQUID DISCHARGING APPARATUS AND LIQUID DISCHARGING METHOD

CROSS-REFERENCE TO RELATED APPLICATIONS

This application claims priority to Japanese Patent Application Nos. 2013-173037 filed on Aug. 23, 2013 and 2013-173038 filed on Aug. 23, 2013. The entire disclosures of Japanese Patent Application Nos. 2013-173037 and 2013-173038 are hereby incorporated herein by reference.

BACKGROUND

1. Technical Field

The present invention relates to a liquid discharging apparatus and a liquid discharging method.

2. Related Art

An ink jet printer which performs recording (printing) of images by discharging ink droplets onto various types of recording media such as paper or film is known as an example of a liquid discharging apparatus. Since it is easy for ink jet printers to record digital color images in high definition, their use rapidly became widespread in a wide range of fields from office use and personal use to industrial uses. The targets of the recording also widened to various media which are used in various fields, and applications to textile printing are particularly common.

Textile printing using ink jet printers does not use the types of dyes which are used in screen textile printing, and it is possible to use design information which is digitized (changed into an electronic format). As a result, it is possible to quickly handle changes in precise designs or the like according to requests from customers, and it is possible to significantly reduce and shorten the labor time and production time. In addition, there is an advantage in that the degree of freedom in the design is large such as it being possible to reproduce gradations of color and the like.

On the other hand, since fabric as a recording medium is a material which is a fiber product such as clothing which is different to recording media where quality is managed under constant standards such as paper, film, or the like which are media for recording images or information, there are various recording characteristics such as the permeability and color development property of inks according to the fabric material, surface texture, and color and there are numerous fabrics where it is difficult to consistently perform forming of desired colors in a color management system which is provided in an ink jet printer in advance. However, there is a problem in that it is not possible to substitute fabrics with other fabrics where only the recording characteristics are superior since there are characteristics, such as individual value and sense of feel with the fabric itself which is different to paper or films as the material which is a fiber product. In contrast to this, a method has been investigated for securing a desired design and coloring by creating textile printing data in advance for each type of fabric and selectively using optimum textile printing data according to the fabric which is the target of the textile printing (see JP-A-2000-345463 (Patent Literature 1), for example).

SUMMARY

However, in the textile printing apparatus and textile printing method described in Patent Literature 1, it is necessary to select textile printing data which corresponds to a desired fabric without error from a large amount of prepared textile printing data at the time of textile printing. In addition, there is also a problem in that there are also numerous fabrics where it is not possible with deal with variations in color, color irregularities, and the like in types of desired fabrics in data which is prepared in advance.

An advantage of some aspects of the present invention is to solve at least a portion of the problems described above and it is possible to realize the present invention as the following applied examples or aspects.

Applied Example 1

A liquid discharging apparatus according to the present applied example is a liquid discharging apparatus which discharges a liquid onto a recording medium and records an image and which is provided with a coloring information acquiring section which acquires coloring information for the recording medium from the recording medium which is supplied to the liquid discharging apparatus and a liquid discharging section which discharges a liquid onto the recording medium based on correction image information which is corrected according to the coloring information.

According to the present applied example, the liquid discharging apparatus is provided with the coloring information acquiring section which acquires coloring information for the recording medium from the recording medium which is supplied to the liquid discharging apparatus and the liquid discharging section which discharges the liquid onto the recording medium based on the correction image information which is corrected according to the coloring information which is acquired. In other words, it is possible to perform recording of an image which is appropriately adjusted to match the coloring information for each recording medium since recording is carried out with the coloring information for the recording medium itself, which is the target onto which the image is to be actually recorded, acquired before recording and the image information to be recorded corrected based on the coloring information. Accordingly, it is possible to conveniently record (print) with a desired coloring or with a coloring which is closer to the desired coloring since it is not necessary to prepare information in advance for appropriately recording for each type of recording medium (for example, fabric in the case of textile printing). As a result, it is possible to further increase productivity by achieving a reduction in the labor time relating to recording, a shortening of the production time, and the like.

In addition, it is possible to produce recorded (printed) matter using the desired coloring in a more stable manner even in a case where there are variations in color or color irregularities in the medium on which recording is carried out since it is possible to correct the image to be recorded by including the variations in color or the color irregularities.

Applied Example 2

It is preferable that the liquid discharging apparatus according to the applied example described above be provided with a supply section which accommodates the recording medium before the liquid is discharged and a transport section which transports the recording medium from the supply section to an image forming section where the liquid discharging section discharges the liquid and forms an image with regard to the recording medium, where the coloring information acquiring section is provided between the supply section and the image forming section on a transport path where the recording medium is transported by the transport section.

Due to the coloring information acquiring section being provided between the supply section and the image forming section on the transport path where the recording medium is transported as in the present applied example, the coloring information for the recording medium which is supplied to the liquid discharging apparatus (in other words, the recording medium itself which is the target onto which the image is to be actually recorded) is acquired without errors.

Applied Example 3

The liquid discharging apparatus according to the applied example described above is provided with a holding section which holds the recording medium at a region which includes the image forming section, where the coloring information acquiring section is provided between the supply section and the holding section on the transport path.

According to the present applied example, the liquid discharging apparatus is provided with the holding section which holds the recording medium at a region which includes the image forming section, where the coloring information acquiring section is provided between the supply section and the holding section on the transport path. It is possible to have a configuration where it is possible to more conveniently acquire the coloring information for the recording medium in a stable manner by providing the coloring information acquiring section between the supply section and the holding section.

In detail, since there are many cases of a configuration where a member which accommodates or supports the recording medium comes into contact with the recording medium in the supply section or the holding section, it is easy for the coloring measuring of the recording medium to be affected by the contacting member in a case where, for example, transmissivity of the recording medium is high (in cases where the material is thin, the coloring is light, and the like). In contrast to this, it is easy to configure an environment where it is possible to carry out coloring measuring without being affected by the surroundings in the region between the supply section and the holding section on the transport path since it is comparatively easy to provide a space for both the front and back surfaces of the recording medium. In other words, it is easy to construct a measuring environment by installing imaging elements or using a combination of a shielding plate, a base plate, where the effects of transmissivity or reflectiveness are reduced, or the like. As a result, it is possible to have a configuration where it is possible to acquire the coloring information for the recording medium in a more stable manner.

Applied Example 4

The liquid discharging apparatus according to the applied example described above is provided with a tension section which generates predetermined tension on the recording medium between the supply section and the holding section on the transport path, where the coloring information acquiring section is provided with the tension section or between the tension section and the holding section on the transport path.

According to the present applied example, the liquid discharging apparatus is provided with the tension section which generates predetermined tension on the recording medium between the supply section and the holding section, where the coloring information acquiring section is provided with the tension section or between the tension section and the holding section. By having such a configuration, it is possible to perform acquiring of the coloring information in a more stable manner since the surface state of the recording medium is constant due to the tension section eliminating wrinkles or the like which occur in the recording medium.

Applied Example 5

The liquid discharging apparatus according to the applied example described above is provided with a tension section which generates predetermined tension on the recording medium between the supply section and the holding section on the transport path, where the coloring information acquiring section is provided between the supply section and the tension section on the transport path.

According to the present applied example, the liquid discharging apparatus is provided with the tension section which generates predetermined tension on the recording medium between the supply section and the holding section, where the coloring information acquiring section is provided between the supply section and the tension section. In a configuration where the tension section is provided in this manner, it is easy to configure an environment where it is possible to carry out coloring measuring without being affected by the surroundings in the region between the supply section and the tension section since it is comparatively easy to provide a space for both the front and back surfaces of the recording medium. It is preferable that the coloring information acquiring section be provided in this region in a case such as where it is not possible to secure a sufficient space for providing the coloring information acquiring section in the region between the tension section and the holding section.

Applied Example 6

The liquid discharging apparatus according to the applied example described above is provided with a holding section which holds the recording medium at a region which includes the image forming section, where the coloring information acquiring section is provided in a region where the holding section extends on the transport path.

According to the present applied example, the liquid discharging apparatus is provided with the holding section which holds the recording medium at a region which includes the image forming section, where the coloring information acquiring section is provided in a region where the holding section extends. Since the recording medium is held by the holding section, it is possible to maintain a constant measuring environment for coloring information and it is possible to have a configuration where it is possible to acquire the coloring information for the recording medium in a stable manner.

Applied Example 7

The liquid discharging apparatus according to the applied example described above is provided with a discharge scanning section which moves the liquid discharging section in a direction which intersects with a direction in which the recording medium is transported by the transport section in the image forming section, where the coloring information acquiring section moves integrally with the liquid discharging section due to the discharge scanning section.

According to the present applied example, the liquid discharging apparatus is provided with the discharge scanning section which moves the liquid discharging section in a direction which intersects with a direction in which the recording medium is transported by the transport section in the image forming section, where the coloring information acquiring section moves integrally with the liquid discharging section due to the discharge scanning section. By having such a configuration, it is possible for the coloring information acquiring section to be provided in a region which is very close to the liquid discharging section. In other words, since it is possible to shorten a distance between the location for acquiring coloring information on the recording medium and the location for recording which is corrected according to the coloring information, recording a corrected image with high positional precision is possible with deforming or extending of the recording medium having little effect even in a case where, for example, it is necessary to carry out fine color correction due to color irregularities, staining, or the like.

In addition, it is possible for the coloring information acquiring section to acquire the coloring information for the recording medium while scanning the surface of the recording medium along with the liquid discharging section. In other words, it is possible for the coloring information acquiring section to have a more compact configuration without it being necessary to configure the coloring information acquiring section as a large (long) detecting section (an imaging section) which spans the width direction of the recording medium.

Applied Example 8

In the liquid discharging apparatus according to the applied example described above, the coloring information acquiring section has a light source which irradiates light onto the recording medium and a light receiving element which receives reflected light of the light.

According to the present applied example, the coloring information acquiring section has the light source which irradiates light onto the recording medium and the light receiving element which receives the reflected light of the light. It is possible to suppress the effects of external light and it is possible to perform acquiring of the coloring information in a more stable manner by having a configuration where the reflected light of the light which is irradiated onto the recording medium is detected using a light receiving element.

Applied Example 9

A liquid discharging apparatus according to the present applied example is a liquid discharging apparatus which discharges a liquid onto a recording medium and records an image, where arranging of the liquid which is discharged onto the recording medium is different in a case where coloring of the recording medium which is supplied to the liquid discharging apparatus is different.

In the liquid discharging apparatus according to the present applied example, the arranging of the liquid which is discharged onto the recording medium is different in a case where the coloring of the recording medium which is supplied to the liquid discharging apparatus is different. It is possible to change the coloring of the recording (the image) which is formed on the recording medium according to the arranging of the liquid (the ink droplets) which is discharged. In addition, in a case where the coloring of the recording medium is different even when the arranging of the liquid which is discharged onto the recording medium is the same, there are cases where the coloring of the image which is obtained as a result is different due to the effect of the coloring of the recording medium being different.

By discharging of the liquid such that the arranging is different with regard to the recording media with coloring which is different, it is possible for the liquid discharging apparatus according to the present applied example to record an image with the desired coloring or a coloring which is closer to the desired coloring by eliminating or reducing the effects of the coloring of the recording medium on the coloring of the image which is obtained as a result.

Applied Example 10

A liquid discharging method according to the present applied example is a liquid discharging method for recording an image on a recording medium by discharging a liquid onto the recording medium using a liquid discharging apparatus and includes acquiring recording image information which is to be recorded on the recording medium, acquiring coloring information for the recording medium which is supplied to the liquid discharging apparatus, generating liquid discharge control information based on the recording image information and the coloring information, and discharging the liquid onto the recording medium based on the liquid discharge control information.

The liquid discharging method according to the present applied example includes acquiring the recording image information which is to be recorded on the recording medium and acquiring the coloring information for the recording medium which is supplied to the liquid discharging apparatus. In addition, the liquid discharging method includes generating the liquid discharge control information based on the recording image information and the coloring information and discharging the liquid onto the recording medium based on the liquid discharge control information. In other words, the coloring information for the recording medium itself, which is the target onto which the image is to be actually recorded, is acquired before recording and recording is performed by correcting the image information to be recorded based on the coloring information. As a result, it is possible to perform recording of an image which is appropriately adjusted to match the coloring information for each recording medium. In other words, it is possible to conveniently record (print) with a desired coloring or with a coloring which is closer to the desired coloring since it is not necessary to prepare information in advance for appropriately recording for each type of recording medium (for example, fabric in the case of textile printing). As a result, it is possible to further increase productivity by achieving a reduction in the labor time relating to recording, a shortening of the production time, and the like.

In addition, it is possible to produce recorded (printed) matter using the desired coloring in a more stable manner even in a case where there are variations in color, color irregularities, and the like in the medium on which recording is carried out since it is possible to correct the image to be recorded by including the variations in color, the color irregularities, and the like.

Applied Example 11

In the liquid discharging method according to the applied example described above, the generating of the liquid discharge control information includes generating a correction look up table by correcting a look up table which converts the recording image information into the liquid discharge control information, which corresponds to the recording image information, based on the coloring information and converting the recording image information into the liquid discharge control information according to the correction look up table.

According to the present applied example, the generating of the liquid discharge control information includes generating the correction look up table by correcting a look up table which converts the recording image information into the liquid discharge control information, which corresponds to the recording image information, based on the coloring information for the recording medium which is supplied to the liquid discharging apparatus. In addition, the generating of the liquid discharge control information includes converting the recording image information into the liquid discharge control information according to the correction look up table. The look up table is a data conversion table for converting the recording image information into the liquid discharge control information which corresponds to the recording image information. By correcting the conversion table based on the coloring information for the recording medium which is supplied to the liquid discharging apparatus, it is possible to obtain the liquid discharge control information where the desired coloring or a coloring which is closer to the desired coloring is obtained by eliminating or reducing the effects of the coloring of the recording medium. As a result, it is possible to more conveniently record an image with the desired coloring.

Applied Example 12

In the liquid discharging method according to the applied example described above, the generating of the liquid discharge control information includes generating correction recording image information by correcting the recording image information based on the coloring information and generating the liquid discharge control information based on the correction recording image information.

According to the present applied example, the generating of the liquid discharge control information includes generating the correction recording image information by correcting the recording image information based on the coloring information for the recording medium which is supplied to the liquid discharging apparatus and generating the liquid discharge control information based on the correction recording image information. The recording image information is, for example, typical digital image information which is acquired with a typical digital camera or the like. Since the liquid discharge control information is generated based on the correction recording image information which is obtained by correcting the image information based on the coloring information for the recording medium which is supplied to the liquid discharging apparatus, it is possible to record an image with the desired coloring or a coloring which is closer to the desired coloring by eliminating or reducing the effects of the coloring of the recording medium.

Applied Example 13

In the liquid discharging method according to the present applied example, the generating of the liquid discharge control information includes correcting the liquid discharge control information which corresponds to the recording image information based on the coloring information.

According to the present applied example, the generating of the liquid discharge control information includes correcting the liquid discharge control information which corresponds to the recording image information based on the coloring information for the recording medium which is supplied to the liquid discharging apparatus. The liquid discharging apparatus discharges the liquid onto the recording medium based on the liquid discharge control information. Since the liquid discharge control information is corrected based on the coloring information for the recording medium which is supplied to the liquid discharging apparatus, it is possible to record an image with the desired coloring or a coloring which is closer to the desired coloring by eliminating or reducing the effects of the coloring of the recording medium.

Applied Example 14

A liquid discharging method according to the present applied example is a liquid discharging method for recording an image on a recording medium by discharging a liquid onto the recording medium using a liquid discharging apparatus, where arranging of the liquid which is discharged onto the recording medium is different in a case where coloring of the recording medium which is supplied to the liquid discharging apparatus is different.

According to the present applied example, the arranging of the liquid which is discharged onto the recording medium is different in a case where the coloring of the recording medium which is supplied to the liquid discharging apparatus is different. It is possible to change the coloring of the recording (the image) which is formed on the recording medium according to the arranging of the liquid (the ink droplets) which is discharged. In addition, in a case where the coloring of the recording medium is different even when the arranging of the liquid which is discharged onto the recording medium is the same, there are cases where the coloring of the image which is obtained as a result is different due to the effect of the coloring of the recording medium being different.

Due to the liquid being discharged such that the arranging is different with regard to the recording media with coloring which is different, it is possible for an image with the desired coloring or a coloring which is closer to the desired coloring to be recorded in the liquid discharging method according to the present applied example by eliminating or reducing the effects of the coloring of the recording medium on the coloring of the image which is obtained as a result.

Applied Example 15

A liquid discharging apparatus according to the present applied example is a liquid discharging apparatus which discharges a liquid onto a recording medium and records an image and which is provided with a liquid discharging section which discharges the liquid onto the recording medium based on correction image information which is corrected according to coloring information for the recording medium which is obtained from the recording medium which is supplied to the liquid discharging apparatus.

According to the present applied example, the liquid discharging apparatus is provided with the liquid discharging section which discharges the liquid onto the recording medium based on the correction image information which is corrected according to the coloring information for the recording medium which is obtained from the recording medium which is supplied to the liquid discharging apparatus. In other words, the coloring information for the recording medium itself, which is the target onto which the image is to be actually recorded, is acquired before recording and recording is performed by correcting the image information to be recorded based on the coloring information. Therefore, it is possible to perform recording of an image which is appropriately adjusted to match the coloring information for each recording medium. In other words, it is possible to conveniently record (print) with a desired coloring or with a coloring which is closer to the desired coloring since it is not necessary to prepare information in advance for appropriately recording for each type of recording medium (for example, fabric in the case of textile printing). As a result, it is possible to further increase productivity by achieving a reduction in the labor time relating to recording, a shortening of the production time, and the like.

In addition, it is possible to produce recorded (printed) matter using the desired coloring in a more stable manner even in a case where there are variations in color or color irregularities in the medium on which recording is carried out since it is possible to correct the image to be recorded by including the variations in color, the color irregularities, and the like.

Applied Example 16

In the liquid discharging apparatus according to the present applied example, it is preferable that a coloring information acquiring section which acquires the coloring information be provided.

Due to the liquid discharging apparatus being provided with the coloring information acquiring section which acquires the coloring information for the recording medium as in the present applied example, it is possible for the liquid discharging apparatus to acquire the coloring information for the recording medium itself which is the target onto which the image is to be actually recorded in real time.

Applied Example 17

In the liquid discharging apparatus according to the present applied example, it is preferable that a correction processing section which generates the correction image information according to the coloring information be provided.

Due to the liquid discharging apparatus being provided with the correction processing section which generates the correction image information according to the coloring information for the recording medium as in the present applied example, it is possible to generate the correction image information which is appropriately corrected according to the coloring information for the recording medium itself which is the target onto which the image is to be actually recorded in real time.

Applied Example 18

The liquid discharging apparatus according to the present applied example is provided with an image information input section where recording image information is input, where the correction processing section generates the correction image information by correcting the recording image information according to the coloring information.

By providing the liquid discharging apparatus with the image information input section where recording image information is input and by the correction processing section correcting the recording image information which is input according to the coloring information for the recording medium itself which is the target onto which the image is to be actually recorded and generating the correction image information, it is possible to conveniently record (print) a desired image with a desired coloring to match the coloring information for the recording medium.

Applied Example 19

A liquid discharging apparatus according to the present applied example is a liquid discharging apparatus, which discharges a liquid onto a recording medium and records an image, where arranging of the liquid which is discharged onto the recording medium is different in a case where coloring of the recording medium which is supplied to the liquid discharging apparatus is different.

In the liquid discharging apparatus according to the present applied example, the arranging of the liquid which is discharged onto the recording medium is different in a case where the coloring of the recording medium which is supplied to the liquid discharging apparatus is different. It is possible to change the coloring of the recording (the image) which is formed on the recording medium according to the arranging of the liquid (the ink droplets) which is discharged. In addition, in a case where the coloring of the recording medium is different even when the arranging of the liquid which is discharged onto the recording medium is the same, there are cases where the coloring of the image which is obtained as a result is different.

Due to the liquid being discharged such that the arranging is different with regard to the recording media with coloring which is different, it is possible for the liquid discharging apparatus according to the present applied example to record an image with the desired coloring or a coloring which is closer to the desired coloring by eliminating or reducing the effects of the coloring of the recording medium on the coloring of the image which is obtained as a result.

BRIEF DESCRIPTION OF THE DRAWINGS

Referring now to the attached drawings which form a part of this original disclosure.

DETAILED DESCRIPTION OF EXEMPLARY EMBODIMENTS

Embodiments which embody the present invention will be described below with reference to the diagrams. The following is one embodiment of the present invention and does not limit the present invention. Here, in each of the diagrams below, there are cases where description is given using a scale which is different to the actual scale in order to facilitate easier understanding of the description.

First Embodiment

Figure 1A:
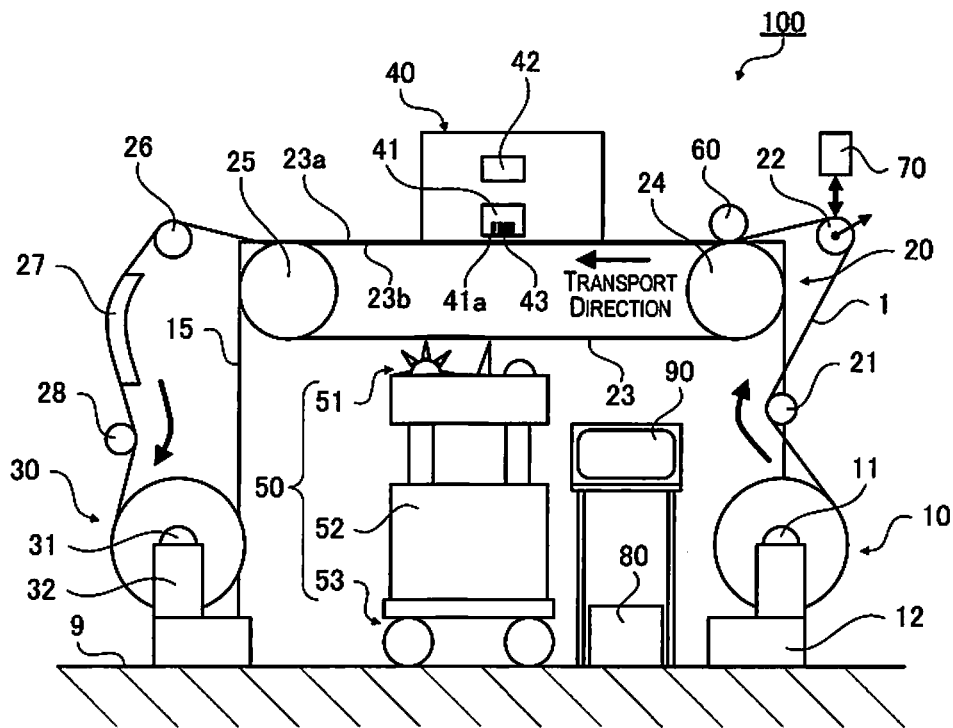
FIG. 1A is a schematic diagram illustrating a textile printing apparatus as a "liquid discharging apparatus" according to a first embodiment.
Figure 1B:
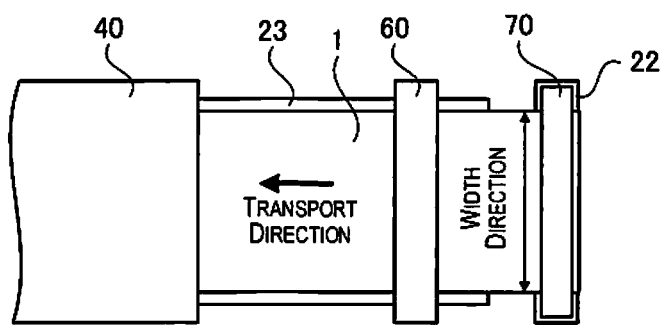
FIG. 1B is a planar diagram illustrating arranging of a coloring information acquiring section.

FIG. 1A is a schematic diagram illustrating a textile printing apparatus 100 as a "liquid discharging apparatus" according to a first embodiment and FIG. 1B is a planar diagram illustrating arranging of a coloring information acquiring section. FIG. 1A illustrates the textile printing apparatus 100, which is installed on a floor surface, from a side surface and FIG. 1B illustrates arranging of a coloring information acquiring section, which is provided in the textile printing apparatus 100, from the upper surface.

The textile printing apparatus 100 is a liquid discharging apparatus which performs textile printing on a fabric 1 by forming (recording) an image by discharging ink as a "liquid" onto the fabric 1 as a "recording medium".

The textile printing apparatus 100 has a fabric supply section 10 as a "supply section", a fabric transport section 20 as a "transport section", a fabric collecting section 30, an ink jet section 40 as an "image forming section", a maintenance section 50, a fabric pressing section 60, a coloring measuring section 70 as the "coloring information acquiring section", a control section 80, and an image information input section 90. Each of the sections of the textile printing apparatus 100 is attached to a frame section 15.

Fabrics such as, for example, cotton, silk, wool, synthetic fibers, and mixed fabrics are used as the fabric 1. In the present embodiment, an example of a configuration where an image is formed with regard to a strip of fabric, which is supplied by a rolling method, will be described, but the configuration is not limited to this and may be another configuration (for example, a configuration where a recording medium for single wafer processing is the target).

The fabric supply section 10 accommodates the fabric 1 before ink is discharged, in other words, where forming of a desired image is not yet performed. The fabric supply section 10 has a shaft section 11 and a bearing section 12.

The shaft section 11 is formed with a cylindrical or columnar shape and supports the fabric 1 so as to be able to rotate in the circumferential direction in a roll center section of a strip of the fabric 1 which is wound in the shape of a roll. The shaft section 11 is attached so as to be able to be attached and detached with regard to the bearing section 12.

The bearing section 12 supports both ends of the shaft section 11 in the shaft axis direction such that the shaft section 11 is able to rotate. The bearing section 12 has a rotation driving section (which is omitted from the diagram) which rotates and drives the shaft section 11. The rotation driving section rotates the shaft section 11 in a direction in which the fabric 1 is sent out. The operation of the rotation driving section is controlled by the control section 80. Here, it is not always necessary to have the rotation driving section in a case where the fabric 1 is stably drawn out by the fabric transport section 20.

The fabric transport section 20 transports the fabric 1 on a transport path from the fabric supply section 10 to the fabric collecting section 30 via the ink jet section 40. The fabric transport section 20 has transport rollers 21, 26, and 28, a tension roller 22 as a "tension section", a transport belt 23, a belt rotation roller 24, a belt driving roller 25, a drying unit 27, and the like.

The transport belt 23 is formed to be endless and is hooked around the belt rotation roller 24 and the belt driving roller 25. The transport belt 23 is held in a state where predetermined tension is applied such that a portion between the belt rotation roller 24 and the belt driving roller 25 is parallel with a floor surface 9. The surface of the transport belt 23 (a support surface 23a) is provided with an adhesive layer (which is omitted from the diagram) to which the fabric 1 adheres. The transport belt 23 supports the fabric 1 on the support surface 23a where the adhesive layer is provided as a "holding section".

The tension roller 22 is provided between the fabric supply section 10 and the transport belt 23 on the transport path and generates the predetermined tension in the fabric 1 between the tension roller 22 and the transport belt 23 (the support surface 23a to which the fabric 1 adheres).

The transport roller 21 relays the fabric 1 between the fabric supply section 10 and the tension roller 22.

The belt rotation roller 24 and the belt driving roller 25 support an inner circumferential surface 23b of the transport belt 23. Here, a configuration may be provided where a support section, which supports the transport belt 23 from the inner circumferential surface 23b, is provided between the belt rotation roller 24 and the belt driving roller 25. The belt rotation roller 24 rotates in accordance with rotation of the transport belt 23.

The transport belt 23 rotates according to rotation of the belt driving roller 25 and the belt rotation roller 24 rotates in accordance with rotation of the transport belt 23. The fabric 1 which is supported by the transport belt 23 (the support surface 23a) is transported in a predetermined transport direction according to rotation of the transport belt 23. The belt rotation roller 24 is arranged on the transport path on the upstream side of the belt driving roller 25. In other words, a direction from the belt rotation roller 24 to the belt driving roller 25 is the transport direction.

The transport roller 26 relays the fabric 1 which is transported by the transport belt 23. The drying unit 27 is provided between the transport roller 26 and the transport roller 28 and guides and dries the fabric 1 after ink is discharged. The transport roller 28 relays the fabric 1, which is guided by the drying unit 27, to the fabric collecting section 30.

The fabric collecting section 30 accommodates the fabric 1 after ink is discharged, in other words, after the forming of the desired image is performed. The fabric collecting section 30 has a shaft section 31 and a bearing section 32.

The shaft section 31 is formed with a cylindrical or columnar shape and is provided so as to be able to rotate in the circumferential direction. The strip of the fabric 1 is wound in the shape of a roll on the shaft section 31. The shaft section 31 is attached so as to be able to be attached and detached with regard to the bearing section 32. As a result, it is possible to take out the fabric 1 along with the shaft section 31 by taking out the shaft section 31 from the bearing section 32 in a state where the fabric 1 is wound on the shaft section 31.

The bearing section 32 supports both ends of the shaft section 31 in the shaft axis direction so that the shaft section 31 is able to rotate. The bearing section 32 has a rotation driving section (which is omitted from the diagram) which rotates and drives the shaft section 31. The rotation driving section rotates the shaft section 31 in a direction in which the fabric 1 is wound. The operation of the rotation driving section is controlled by the control section 80.

The ink jet section 40 discharges ink with regard to the fabric 1. The ink jet section 40 has a head 41 as a "liquid discharging section" and a head moving section 42 as a "discharge scanning section". The head 41 is provided with a discharging surface 41a which discharges ink. A plurality of nozzles 43 which discharge ink are formed in the discharging surface 41a. The discharging surface 41a faces toward the fabric 1 which is transported by the transport belt 23. The head moving section 42 is configured from a carriage where the head 41 is mounted, a guiding shaft which is provided in a direction which intersects with the transport direction of the fabric 1, a driving mechanism which moves the carriage along the guiding shaft, and the like (which are omitted from the diagram), and moves the head 41 in a direction (the width direction of the fabric 1) which intersects with the transport direction.

For example, four nozzle arrays are formed in the head 41 by a plurality of the nozzles 43 which are arranged along the transport direction of the fabric 1 and inks of different colors (for example, cyan: C, magenta: M, yellow: Y, and black: K) are discharged for each of the nozzle arrays.

The maintenance section 50 performs maintenance of the transport belt 23. The maintenance section 50 has a processing section 51, a base section 52, a moving section 53, and the like. The processing section 51 has a mechanism (which is omitted from the diagram) which performs various types of processes with regard to the transport belt 23 such as, for example, a removal section which removes foreign matter such as dust or lint which is attached to the transport belt 23, or an adhesive layer repairing section which repairs the adhesive layer such as in cases where the adhesive layer of the transport belt 23 deteriorates, or the like. The base section 52 supports the processing section 51 so as to be able to rise and fall. The moving section 53 integrally moves the processing section 51 and the base section 52 along the floor surface 9.

The fabric pressing section 60 is installed at an upper section of the transport belt 23 which is more to the upstream side of the transport path than the ink jet section 40. The fabric pressing section 60 presses the fabric 1 onto the support surface 23$a$ which has the adhesive layer and prevents the fabric 1 from separating (floating away) from the transport belt 23.

The coloring measuring section 70 acquires coloring information on the fabric 1 by analyzing the coloring information into hues. For example, a CCD (Charge Coupled Device) line sensor or the like is used as the coloring measuring section 70.

In addition, the coloring measuring section 70 has an output section (which is omitted from the diagram) which outputs the result of acquiring the coloring information. The coloring information which is output from the output section is transmitted to, for example, the control section 80, the image information input section 90, or the like.

Here, for example, a detector or the like, which is provided with a "light source" which emits white light or light with three types of hues which are red (R), green (G), and blue (B) and a "light receiving element" which detects hues of reflected light when the light from the light source is irradiated onto the fabric 1, may be used for the coloring measuring section 70.

The coloring measuring section 70 is arranged at a position where it is possible to measure the state before an image is formed on the fabric 1, in other words, on the transport path on the upstream side of the fabric 1 with regard to the head 41. In detail, the coloring measuring section 70 is installed at the position of the tension roller 22. In more detail, the coloring measuring section 70 is arranged at a position where the tension roller 22 and the fabric 1 come into contact and coloring is measured (detected) at a region where the fabric 1 is held as shown in FIG. 1A.

FIG. 1B is a planar diagram illustrating arranging of the coloring measuring section 70. As shown in FIG. 1B, the coloring measuring section 70 is arranged so as to cover the entirety of the fabric 1 in the width direction. It is possible for the coloring measuring section 70 to acquire coloring information which spans the entirety of the fabric 1 in the width direction. In addition, it is possible for the coloring measuring section 70 to measure a region which protrudes from both end sections of the fabric 1 in the width direction. According to this configuration, it is possible to acquire the coloring information even in a case where the transport path of the fabric 1 deviates in the width direction.

Figure 2:
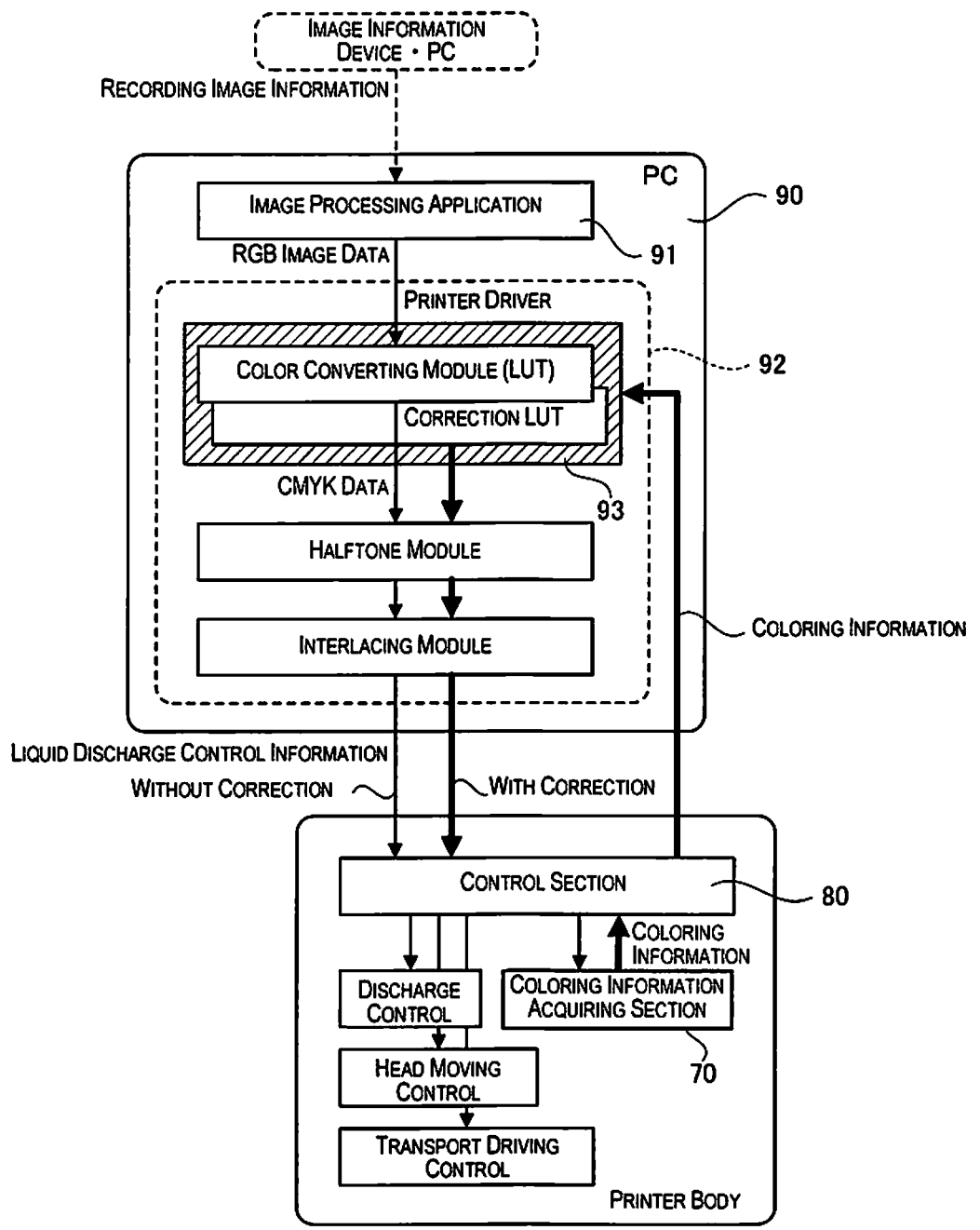
FIG. 2 is a block diagram illustrating examples of the functions of a control section and an image information input section.

FIG. 2 is a block diagram illustrating examples of the functions of the control section 80 and the image information input section 90.

The image information input section 90 is, for example, a personal computer (PC) and recording image information, which is a desired image which is to be printed onto the fabric 1, is input through the image information input section 90. The image information input section 90 has typical application software 91, which carries out image processing on the recording image information (for example, typical RGB digital image information) which is input from an external image information device (for example, a digital camera) or an external PC, conversion software 92 (for example, a printer driver) which converts the recording image information into liquid discharge control information for driving and controlling the textile printing apparatus 100, and the like.

The conversion software 92 is provided with a color converting module as a "look up table (referred to below as a LUT)", a halftone module, an interlacing module, and the like.

The look up table is a color converting module which converts the recording image information into the liquid discharge control information which corresponds to the recording image information. In detail, RGB color data is converted into CMYK color data. The CMYK format is a color mode which is configured by cyan (C), magenta (M), yellow (Y), and black (K). The halftone module and the interlacing module perform a process (binarization processing, array processing, and the like) where the CMYK based image information is switched to information on dots which are actually discharged from each of the nozzles 43.

In addition, the image information input section 90 is provided with an LUT correction processing module 93 in order to generate "correction image information" according to the coloring information on the fabric 1 which is obtained from the fabric 1.

The LUT correction processing module 93 has a function of correcting the LUT based on the coloring information on the fabric 1 which is obtained from the fabric 1.

The LUT correction processing module 93 generates a correction LUT by correcting the LUT based on the coloring information on the fabric 1 and generates correction image information by converting the recording image information into the liquid discharge control information according to the correction LUT (as well as the halftone module, the interlacing module, and the like) in the conversion software 92. In other words, the conversion software 92 which includes the correction LUT functions as a "correction processing section" which generates correction image information according to the coloring information on the fabric 1 and it is possible to obtain the liquid discharge control information as the "correction image information" which is corrected based on the coloring information on the fabric 1.

An example of a method where the correction LUT is generated by correcting the LUT based on the coloring information on the fabric 1 will be described.

The LUT correction processing module 93 has an LUT correction algorithm which generates a correction LUT with regard to a typical LUT. The typical LUT is an LUT before correction, for example, an LUT which is applied with regard to a fabric with a coloring where correction is not necessary (for example, white).

The LUT correction algorithm is, for example, an algorithm which generates an LUT which is converted by subtracting a deviation amount in a case where RGB data in the recording image information is superimposed on RGB data which is the coloring information on the fabric 1. In other words, an LUT is generated where CMYK data is derived as a result of the deviation amount being subtracted in an LUT which converts RGB data into CMYK data using the LUT correction algorithm. However, since there are cases where it is not possible to obtain the CMYK deviation amount which actually appears on the recording medium such as the fabric 1 by simple addition and subtraction calculation of RGB (or CMYK) data of each of the recorded image and the recording medium, it is preferable that appropriate adjustment be carried out according to the coloring of the recording medium which is assumed in advance.

In this manner, in a case where the coloring of the fabric 1 which is supplied to the textile printing apparatus 100 is different, a corresponding correction LUT is generated by the LUT correction processing module 93, and arranging of ink, which is different to arranging of ink which is generated by a typical LUT (an array of dots which are actually discharged from each of the nozzles 43), is determined according to the correction LUTs which correspond to each of the colorings.

The control section 80 performs overall control of each of the sections of the textile printing apparatus 100. In detail, the control section 80 performs control of the ink jet section 40 (control of discharging of ink with regard to the head 41 or control of moving the head with regard to the head moving section 42), control of transport driving with regard to the fabric transport section 20, control of measuring by the coloring measuring section 70, transferring of the coloring information which is acquired, and the like in accordance with the liquid discharge control information which is input from the image information input section 90.

The control section 80 sends the coloring information on the fabric 1, which is acquired by the coloring measuring section 70, to the image information input section 90. In addition, the control section 80 performs control of the ink jet section 40 based on the correction image information (the liquid discharge control information which is corrected) which is converted based on the coloring information on the fabric 1.

Next, a method of textile printing on the fabric 1 will be illustrated as a "liquid discharging method" by describing a series of operations of the textile printing apparatus 100 which is configured as described above with reference to FIG. 1A and FIG. 2.

The liquid discharging method (the method of textile printing on the fabric 1) includes at least the following steps.

That is, the liquid discharging method includes acquiring the recording image information which is to be recorded on the fabric 1, acquiring the coloring information on the fabric 1 which is supplied to the textile printing apparatus 100, generating liquid discharge control information based on the recording image information and the coloring information on the fabric 1, and discharging ink onto the fabric 1 based on the liquid discharge control information. The details will be described below.

Firstly, the recording image information which is to be recorded (textile-printed) on the fabric 1 is taken into the image information input section 90.

Next, the fabric 1 in the shape of a roll is set in the fabric supply section 10, the fabric 1 is guided in accordance with the transport path, and a front end section of the fabric 1 is held on the support surface 23*a* of the transport belt 23 by the fabric pressing section 60.

Next, the fabric transport section 20 is driven and the fabric 1 is moved in the transport direction. At the same time, the fabric supply section 10 sends out the fabric 1.

Next, the coloring measuring section 70 starts to acquire the coloring information on the fabric 1, which reached the measuring range of the coloring measuring section 70, under the control of the control section 80. The control section 80 sends the coloring information on the fabric 1, which is acquired by the coloring measuring section 70, to the image information input section 90.

Next, as the generating of the liquid discharge control information, firstly, the image information input section 90 which received the coloring information on the fabric 1 generates a correction LUT by correcting an LUT based on the coloring information on the fabric 1 according to the LUT correction processing module 93. As the generating of the liquid discharge control information, next, the image information input section 90 generates correction image information by converting the recording image information into the liquid discharge control information according to the correction LUT (as well as the halftone module, the interlacing module, and the like).

The control section 80 performs control of the ink jet section 40 and control of the fabric transport section 20 based on the correction image information (the liquid discharge control information which is corrected) which is converted based on the coloring information on the fabric 1. In detail, the control section 80 performs control of discharging of the ink with regard to the head 41 or control of moving the head with regard to the head moving section 42, discharges ink from the nozzle 43 while moving the head 41 in the width direction of the fabric 1, records (textile prints) an image in the region of the fabric 1 which corresponds to the position where the coloring information is acquired, and performs transport of the fabric 1 in synchronization with the recording operation.

Next, the portion of the front end section of the fabric 1 and beyond where the image is recorded is separated from the support surface 23*a* and guided to the transport roller 26, the drying unit 27, the transport roller 28, and the fabric collecting section 30 in accordance with the transport path. The fabric collecting section 30 accommodates the fabric 1 where ink is discharged and dried while winding the fabric 1.

After this, recording (textile printing due to image forming) continues without stopping.

Here, it is preferable that the degree of positional association between the coloring information acquiring location on the fabric 1 and the recording location of the image, which is corrected to correspond with the coloring information acquiring location, be appropriately set according to the desired image. In detail, for example, a method where setting of the degree of positional association is performed in association with fine regions of the fabric 1, a method where setting of the degree of positional association is performed for each of manufacturing lots of the fabric 1, or the like may be considered.

The method where setting of the degree of positional association is performed in association with fine regions of the fabric 1 is, for example, a method where the coloring information acquiring for the fabric 1 is performed in each of regions which are finely divided out of the fabric 1, generating of the correction LUT is carried out in each of these regions, and the image, which is corrected according to the correction LUT in each of the regions, is formed in the region where the corresponding coloring information is acquired. Using this method, it is possible to perform image forming (textile printing) which corresponds to coloring variations, staining, or the like on the fabric 1.

The method where setting of the degree of positional association is performed for each of the manufacturing lots of the fabric 1 is a method where, for example, the coloring information on the fabric 1 is initially acquired for each of the manufacturing lots of the fabric 1 in a case such as where coloring variations in the fabric 1 are small, the correction LUT is generated at one time to match the coloring information, and recording of the image which is corrected according to the correction LUT is continued until the manufacturing lot of the fabric 1 is switched.

In addition, in either case a single correction may be applied across the width of the recording material, or the width may be split into different regions of any predetermined size and separate correction applied to the region depending on the color of the region.

In addition, in a case such as where the coloring variations of the fabric 1 are smaller, the method may be a method where the coloring information on the fabric 1 is initially acquired for each of the types (in other words, each case where the type of fabric is changed), the correction LUT is generated at one time to match the coloring information, and recording of the image which is corrected according to the correction LUT is continued until the fabric 1 is switched.

As described above, it is possible to obtain the following effect using the liquid discharging apparatus and the liquid discharging method according to the present embodiment.

The textile printing apparatus 100 as the liquid discharging apparatus is provided with the head 41 as the "liquid discharging section" which discharges ink as the "liquid" onto the fabric 1 based on the correction image information which is corrected according to the coloring information on the fabric 1 which is obtained from the fabric 1 as the recording medium which is supplied to the textile printing apparatus 100. In other words, since the coloring information on the fabric 1 itself as the target onto which the image is to be actually recorded is acquired before recording and the image information to be recorded is corrected and recorded based on the coloring information, it is possible to perform recording of an image which is appropriately adjusted to match the coloring information for each of the fabrics 1. Therefore, it is possible to conveniently record (print) with the desired coloring or with a coloring which is closer to the desired coloring since it is not necessary to prepare information in advance for appropriately recording for each type of the fabric 1. As a result, it is possible to further increase productivity by achieving a reduction in the labor time relating to recording, a shortening of the production time, and the like.

In addition, it is possible to produce recorded (printed) matter using the desired coloring in a more stable manner even in a case where there are variations in color, color irregularities, and the like in the fabric 1 since it is possible to correct the image to be recorded by including the variations in color, the color irregularities, and the like.

In addition, due to the textile printing apparatus 100 being provided with the coloring measuring section 70 as the "coloring information acquiring section" which acquires the coloring information on the fabric 1, it is possible for the textile printing apparatus 100 to acquire the coloring information on the fabric 1 itself as the target onto which the image is to be actually recorded in real time.

In addition, due to the textile printing apparatus 100 being provided with the LUT correction processing module 93 which generates the correction image information according to the coloring information on the fabric 1, it is possible to generate the correction image information which is appropriately corrected in real time according to the coloring information on the fabric 1 itself as the target onto which the image is to be actually recorded.

In addition, due to the textile printing apparatus 100 being provided with the image information input section 90 where the recording image information is input and the LUT correction processing module 93 correcting the recording image information which is input and generating the correction image information according to the coloring information on the fabric 1 itself as the target onto which the image is to be actually recorded, it is possible to conveniently record (print) a desired image with a desired coloring to match the coloring information on the fabric 1.

In addition, due to the coloring measuring section 70 being provided between the fabric supply section 10 as the "supply section" and the ink jet section 40 as the "image forming section" on the transport path where the fabric 1 is transported, the textile printing apparatus 100 acquires the coloring information on the fabric 1 which is supplied to the textile printing apparatus 100 (in other words, the fabric 1 itself as the target onto which the image is to be actually recorded) without errors.

In addition, the textile printing apparatus 100 is provided with the tension roller 22 as the "tension section" between the fabric supply section 10 and the portion where the fabric 1 is held by the support surface 23*a*, and the coloring measuring section 70 is arranged at the position of the tension roller 22. It is possible for acquiring of the coloring information to be performed in a more stable manner since the surface state of the fabric 1 is constant due to the tension roller 22 eliminating wrinkles or the like which occur in the fabric 1.

Here, the present invention is not limited to the embodiments described above and it is possible to add various changes, alterations, and the like to the embodiments described above. Modified examples will be described later. Here, the same reference numbers are used for the same configuration elements as the embodiments described above and overlapping description will be omitted.

Modified Example 1

Figure 3A:
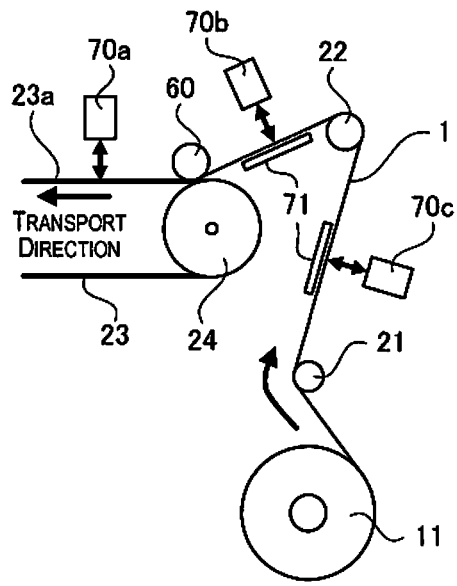
FIGS. 3A and 3B are schematic diagrams illustrating variations in installation positions and configurations of a coloring measuring section in a textile printing apparatus as a modified example 1.
Figure 3B:
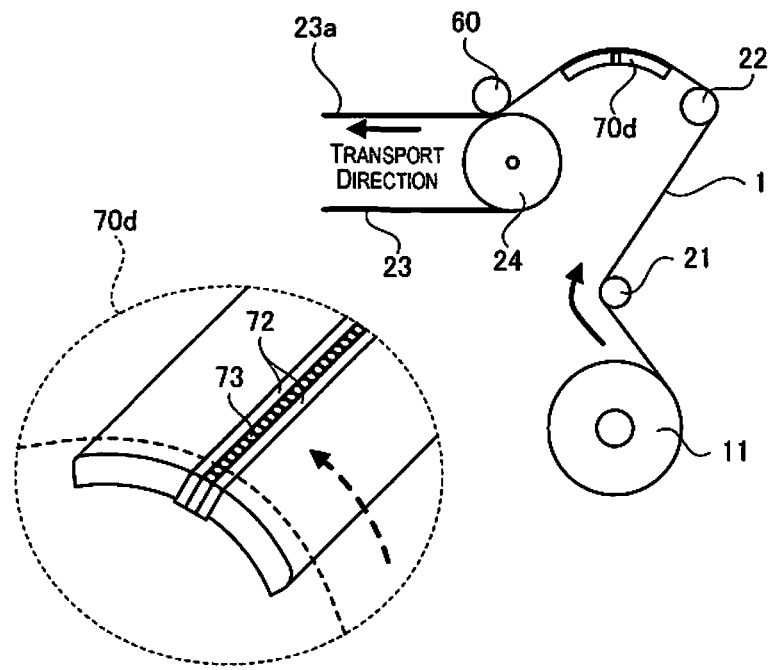

FIGS. 3A and 3B are schematic diagrams illustrating variations in installation positions and configurations of the coloring measuring section 70 in the textile printing apparatus 100 as a modified example 1.

The coloring measuring section 70 is described in the first embodiment as being installed at the position of the tension roller 22 as shown in FIGS. 1A and 1B, but the configuration is not limited to this configuration, and there may be a configuration where, for example, the coloring measuring section 70 is installed at positions of each of coloring measuring sections 70*a*, 70*b*, 70*c*, and 70*d* as shown in FIGS. 3A and 3B.

The coloring measuring section 70*a* is arranged at a position where it is possible to measure the fabric 1 which is held on the transport belt 23, in detail, at a position on the transport path where the fabric 1 is measured at the region where the fabric 1 is held by the support surface 23*a* where the adhesive layer is provided as the "holding section".

Since the fabric 1 is held in a stable manner, it is possible to maintain a constant measuring environment for the coloring information and it is possible to have a configuration where it is possible to acquire the coloring information on the fabric 1 in a stable manner.

The coloring measuring section 70*b* is provided on the transport path between the tension roller 22 and a position where the fabric 1 is pressed onto the support surface 23*a* which has the adhesive layer by the fabric pressing section 60.

Since this region is a region where the fabric 1 is pulled by the tension roller 22 such that there are no wrinkles, the surface state of the fabric 1 is constant and it is possible to perform acquiring of the coloring information in a more stable manner.

In addition, since the region is a region where it is easy to secure a space in the front and back regions of the fabric 1, it is possible to more effectively measure the coloring by arranging a back plate 71 without coloring so as to interpose the fabric 1 in a case such as where the fabric 1 is, for example, a thin cloth and it is easy for light from a light source, which is provided in the coloring measuring section 70*b*, to penetrate the fabric 1.

The coloring measuring section 70*c* is provided on the transport path between the fabric supply section 10 and the tension roller 22.

In this manner, since a space is comparatively easily provided on both the front and back surfaces of the fabric 1 in the region between the fabric supply section 10 and the tension roller 22 even with a configuration where the tension roller 22 is provided, it is easy to configure an environment where it is possible to carry out coloring measuring without being affected by the surroundings. It is preferable that the coloring measuring section 70 be provided in this region in a case such as where it is not possible to secure a sufficient space for providing the coloring measuring section 70 in the region between the tension roller 22 and the fabric pressing section 60.

The coloring measuring section 70*d* which is shown in FIG. 3B is provided at the same position on the transport path as the coloring measuring section 70*b*, but the point that the coloring measuring section 70*d* is configured so as to abut to the fabric 1 is different. In detail, the coloring measuring section 70*d* is abutted such that the fabric 1 is pushed up from the back surface of the fabric 1 which is pulled by the tension roller 22. A surface where the coloring measuring section 70*d* comes into contact with the fabric 1 is configured by a curved surface such that smooth surface contact is possible. In addition, two rows of a light source 72 and a CCD 73 as the "light receiving element" to be interposed between the two rows are aligned in the direction which intersects with the transport direction of the fabric 1 in a central portion of the surface where the coloring measuring section 70*d* comes into contact with the fabric 1.

In this manner, it is possible to measure the coloring in a more stable manner since detecting efficiency is higher due to the measuring distance being shorter and the positional relationship between the coloring measuring section 70*d* and the fabric 1 is more stable, due to the configuration where the coloring measuring section 70*d* is adhered such that the fabric 1 is pushed up from the back surface of the fabric 1 which is pulled by the tension roller 22.

Modified Example 2

Figure 4A:
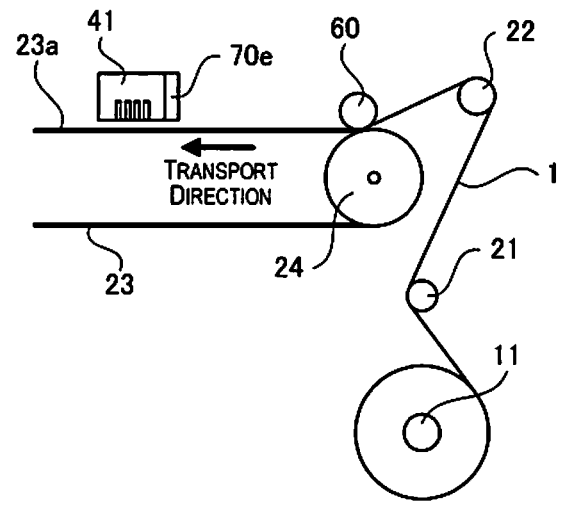
FIGS. 4A and 4B are schematic diagrams illustrating variations in installation positions and configuration of the coloring measuring section in the textile printing apparatus as a modified example 2.
Figure 4B:
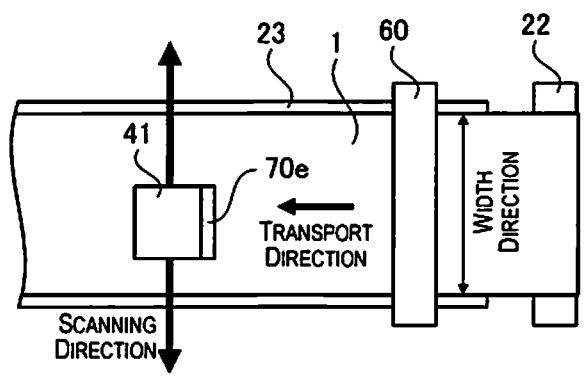

FIGS. 4A and 4B are schematic diagrams illustrating variations in installation positions and configurations of the coloring measuring section 70 in the textile printing apparatus 100 as a modified example 2.

The coloring measuring section 70 is described in the first embodiment as being arranged so as to cover the entirety of the width direction of the fabric 1 at the position of the tension roller 22 as shown in FIG. 1B, but the configuration is not limited to this configuration and the position or the configuration of the coloring measuring section 70*e* which are shown in FIGS. 4A and 4B may be used.

The coloring measuring section 70*e* is moved integrally with the head 41 by the head moving section 42. In detail, whereas the coloring measuring section 70 in the first embodiment is configured using, for example, a line sensor, which is arranged so as to cover the entirety of the width direction of the fabric 1, the coloring measuring section 70*e* uses a smaller line sensor or a smaller area sensor. In other words, the coloring measuring section 70*e* which is smaller is mounted in a carriage (which is omitted from the diagram) which is provided in the head 41 along with the head moving section 42 and is configured to be able to move so as to span the entirety of the width direction of the fabric 1. The coloring measuring section 70*e* which is mounted in the carriage is positioned on the upstream side of the fabric 1 in the transport direction with regard to the head 41. It is possible to obtain the coloring information for the entirety of the width direction of the fabric 1 by performing measuring while moving the coloring measuring section 70*e* along with the head 41.

Due to such a configuration, it is possible for the coloring information acquiring section (the coloring measuring section 70*e*) to be provided at a region which is very close to the liquid discharging section (the head 41). In other words, it is possible to shorten a distance between the location where the coloring information on the fabric 1 is acquired and the location where recording which is corrected according to the coloring information is performed. As a result, recording a corrected image with high positional precision is possible with deforming or extending of the recording medium having little effect even in a case where, for example, it is necessary to carry out fine color correction due to color irregularities, staining, or the like.

In addition, it is possible for the coloring information acquiring section to have a more compact configuration without it being necessary to configure the coloring information acquiring section as a large (long) detecting section (an imaging section) which spans the width direction of the fabric 1.

Modified Example 3

Figure 5:
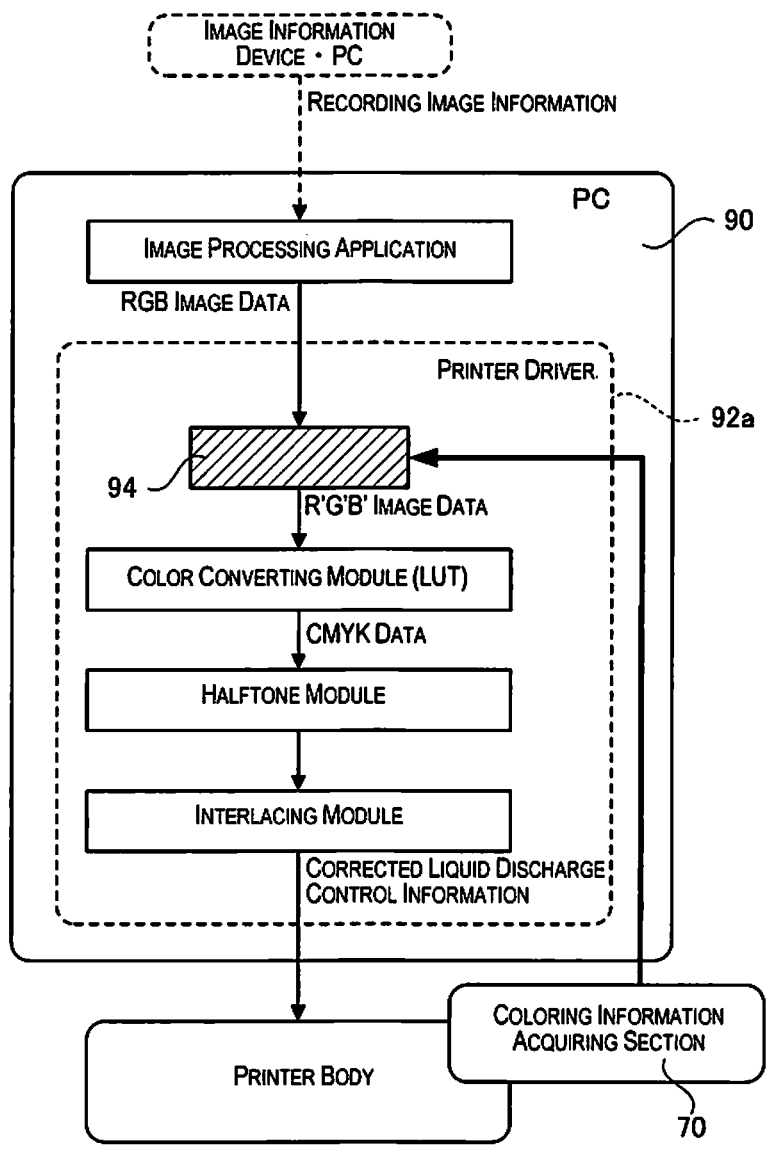
FIG. 5 is a block diagram illustrating a modified example of generating liquid discharge control information which is performed by an image information input section as a modified example 3.

FIG. 5 is a block diagram illustrating a modified example of generating liquid discharge control information which is performed by the image information input section 90 as a modified example 3.

Generating liquid discharge control information is described in the first embodiment as generating the correction image information by generating a correction LUT by correcting an LUT based on the coloring information on the fabric 1 and next converting the recording image information into the liquid discharge control information according to the correction LUT (as well as the halftone module, the interlacing module, and the like).

The generating of the liquid discharge control information is not limited to this process and may, for example, include a process of directly correcting the recording image information (RGB information) which is input.

Details will be described below.

The direct correcting of the recording image information (RGB information) which is input is performed by conversion software 92*a* which is shown in FIG. 5.

The conversion software 92*a* is provided with a RGB correcting module 94, an LUT, a halftone module, an interlacing module, and the like. The conversion software 92*a* is the same as the conversion software 92 except for the point that the RGB correcting module 94 is provided instead of the LUT correction processing module 93.

The RGB correcting module 94 generates the correction recording image information by correcting the recording image information based on the coloring information on the fabric 1. In other words, the RGB correcting module 94 corrects RGB image data in the recording image information as R'G'B' image data in the same RGB format based on the coloring information on the fabric 1. After this, the liquid discharge control information which is corrected by the LUT, the halftone module, the interlacing module, and the like is generated, and ink is discharged onto the fabric 1 based on the liquid discharge control information which is generated. In other words, the conversion software 92a which is provided with the RGB correcting module 94 functions as the "correction processing section" which generates the correction image information according to the coloring information on the fabric 1, and the liquid discharge control information which is corrected is obtained as the "correction image information".

Since recording is performed in accordance with the correction recording image information where the recording image information which is input is corrected based on the coloring information on the fabric 1, it is possible to record an image with the desired coloring or a coloring which is closer to the desired coloring by eliminating or reducing the effects of the coloring of the fabric 1.

In addition, since it is possible to use the LUT and the like without any changes due to the RGB correcting module 94 being provided, it is possible to more conveniently configure the conversion software 92.

Modified Example 4

Figure 6:
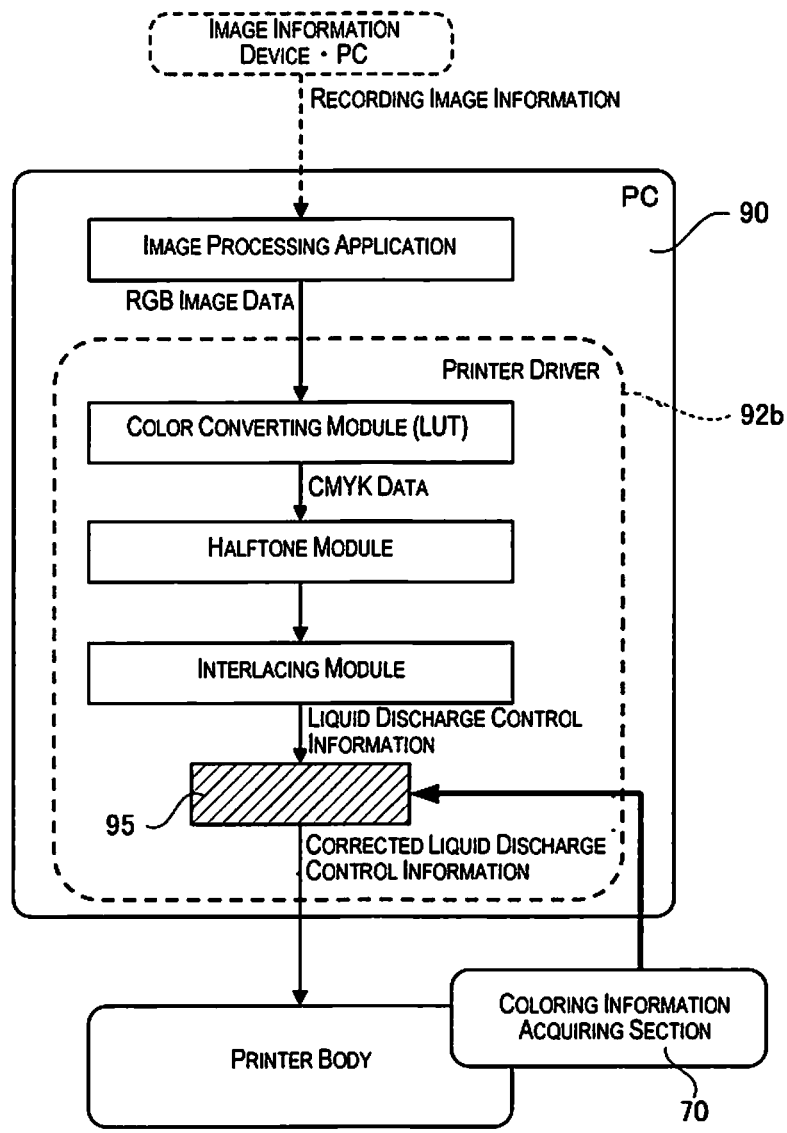
FIG. 6 is a block diagram illustrating a modified example of generating liquid discharge control information which is performed by an image information input section as a modified example 4.

FIG. 6 is a block diagram illustrating a modified example of generating liquid discharge control information which is performed by the image information input section 90 as a modified example 4 in the same manner as the modified example 3.

The generating of liquid discharge control information may include, for example, a process of directly correcting the liquid discharge control information which is generated.

The direct correcting of the liquid discharge control information which is generated is performed by conversion software 92b which is shown in FIG. 6.

The conversion software 92b is provided with a liquid discharge control information correcting module 95, the LUT, the halftone module, the interlacing module, and the like. The conversion software 92b is the same as the conversion software 92 except for the point that the liquid discharge control information correcting module 95 is provided instead of the LUT correction processing module 93.

The liquid discharge control information correcting module 95 directly corrects the liquid discharge control information which is generated by a printer driver or the like in the prior art based on the coloring information on the fabric 1. In other words, the conversion software 92b which is provided with the liquid discharge control information correcting module 95 functions as the "correction processing section" which generates the correction image information according to the coloring information on the fabric 1, and the liquid discharge control information which is corrected is obtained as the "correction image information". Since the liquid discharge control information is corrected based on the coloring information on the fabric 1, it is possible to record an image with the desired coloring or a coloring which is closer to the desired coloring by eliminating or reducing the effects of the coloring of the fabric 1.

In addition, since it is possible to use the LUT and the like without any changes due to the liquid discharge control information correcting module 95 being provided, it is possible to more conveniently configure the conversion software 92.

Other Modified Examples

An example of the configuration where the head 41 moves in the width direction of the fabric 1 is described in the first embodiment and the modified example 1, but the configuration is not limited to this and, for example, may be a configuration where the head (the liquid discharging section) is fixed by arranging the nozzles 43 in the form of lines along the width direction of the fabric 1, that is, a configuration where the head moving section 42 is not provided as the "discharge scanning section".

In addition, an example of a configuration where the coloring information acquiring section (the coloring measuring sections 70, 70a to 70e) is arranged on the upstream side of the fabric 1 in the transport direction with regard to the head 41 is described in the first embodiment and the modified examples 1 and 2, but the configuration is not limited to this. For example, the configuration may be a configuration where the coloring information acquiring section is arranged on the downstream side of the fabric 1 in the transport direction with regard to the head 41. In a case of such a configuration, it is possible to perform correction using a method where a series of textile printing starts after the region of the fabric 1 where recording (discharging of ink) is not carried out with regard to the fabric 1 is set in the measuring region for the coloring information acquiring section, a method where correction is performed in real time while comparing the coloring information on the fabric 1 where recording is performed and the recording image information before correction, or the like.

In addition, in a case where the fabric 1 which has transmissivity is used, the coloring information which is obtained by the coloring measuring section 70 may be corrected according to the transmissivity by measuring the transmissivity of the fabric 1 (or calculating the transmissivity in advance). In addition, the coloring information may be obtained, for example, in a state where the fabric 1 which has transmissivity is mounted on a white support table (using, for example, the back plate 71, which is white, in the coloring measuring sections 70b and 70c in the modified example 1) and white light is transmitted through the fabric 1. In this case, it is sufficient if the effect of the white color of the support table is excluded from the coloring information which is obtained.

In addition, the textile printing apparatus may have a configuration where the coloring measuring section 70 or the image information input section 90 is provided outside of the textile printing apparatus 100 instead of a configuration where the coloring measuring section 70 and the image information input section 90 are included as in the textile printing apparatus 100.

In addition, generating the correction image information by converting the recording image information into the liquid discharge control information according to the correction LUT (as well as the halftone module, the interlacing module, and the like) is described in the first embodiment, but the method of generating the correction image information is not limited to this. For example, the method may be a method where correction is applied with regard to the liquid discharge control information which is obtained according to a typical LUT (as well as the halftone module, the interlacing module, and the like), or may be a method where the liquid discharge control information is generated according to a typical LUT (as well as the halftone module, the interlacing module, and the like) after correction is applied with regard to the information before converting according to the typical LUT (the recording image information which is input to the image information input section 90). The correction may be applied at any stage in the conversion by the conversion software 92.

In a case where the fabric 1 which has transmissivity is used as the recording medium, the coloring information which is obtained by the coloring measuring section 70 may be corrected according to the transmissivity by measuring the transmissivity of the fabric 1 (or calculating the transmissivity in advance). In addition, the coloring information may be obtained, for example, in a state where the tension roller 22 which pulls and supports the fabric 1 is configured to be white and white light is transmitted through the fabric 1. In this case, it is sufficient if the effect of the white color of the tension roller 22 is excluded from the coloring information which is obtained.

Figure 7:
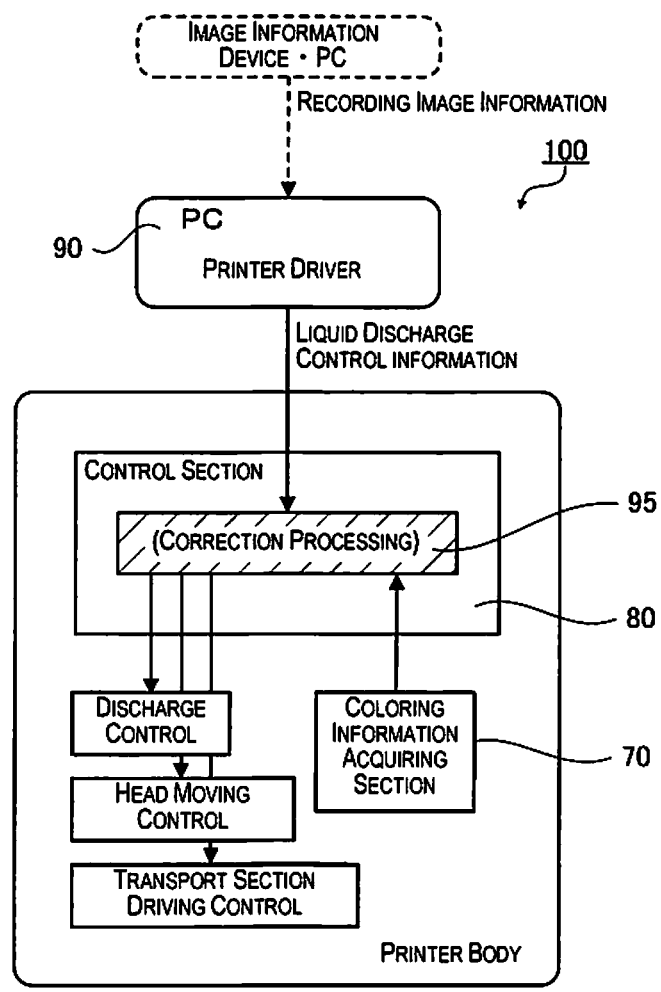
FIG. 7 is a block diagram illustrating examples of the functions which are included in a control section as another modified example.

FIG. 7 is a block diagram illustrating examples of the functions which are included in the control section 80 as another modified example.

An example is described in the embodiments and the modified examples described above where the correction process of the image is performed based on the coloring information on the fabric 1 as a function of the image information input section 90, but the present invention is not limited to this. For example, there may be a configuration where the correction process is performed in the control section 80 as shown in FIG. 7. In detail, there may be a configuration where a function of the liquid discharge control information correcting module 95 which is described in the modified example 4 is provided in the control section 80.

In addition, the textile printing apparatus may have a configuration where the coloring measuring section 70 or the image information input section 90 is provided outside of the textile printing apparatus 100 instead of a configuration where the coloring measuring section 70 and the image information input section 90 are included as in the textile printing apparatus 100.

In addition, the coloring measuring section 70 is described in the first embodiment as being installed at the position of the tension roller 22 where it is possible to measure the state before an image is formed on the fabric 1, but the present invention is not limited to this. For example, the coloring measuring section 70 may be positioned above the transport belt 23 or above the upstream side from the tension roller.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A liquid discharging apparatus configured to discharge a liquid onto a recording medium and configured to record an image, the liquid discharging apparatus comprising:
    a liquid discharging section configured to discharge the liquid onto the recording medium based on correction image information which is corrected according to coloring information for the recording medium which is obtained from the recording medium which is supplied to the liquid discharging apparatus;
    a coloring information acquiring section configured to acquire the coloring information;
    a supply section configured to accommodate the recording medium before the liquid is discharged;
    a transport section configured to transport the recording medium from the supply section to an image forming section where the liquid discharging section discharges the liquid and forms the image with regard to the recording medium;
    a holding section configured to hold the recording medium at a region which includes the image forming section; and
    a tension section configured to generate predetermined tension on the recording medium between the supply section and the holding section on the transport path;
    the coloring information acquiring section being disposed between the supply section and the image forming section on a transport path where the recording medium is transported by the transport section, between the supply section and the holding section on the transport path, and between the supply section and the tension section on the transport path.

2. The liquid discharging apparatus according to claim 1, wherein
    the coloring information acquiring section has a light source which irradiates light onto the recording medium and a light receiving element which receives reflected light of the light.

3. The liquid discharging apparatus according to claim 1, further comprising
    a correction processing section configured to generate the correction image information according to the coloring information.

4. The liquid discharging apparatus according to claim 3, further comprising
    an image information input section to which recording image information is input,
    the correction processing section being further configured to generate the correction image information by correcting the recording image information according to the coloring information.

5. A liquid discharging method for recording an image on a recording medium by discharging a liquid onto the recording medium using the liquid discharging apparatus according to claim 1, the method comprising:
    acquiring recording image information which is to be recorded on the recording medium;

acquiring coloring information for the recording medium which is supplied to the liquid discharging apparatus using the coloring information acquiring section;

generating liquid discharge control information based on the recording image information and the coloring information; and discharging the liquid onto the recording medium using the liquid discharging section based on the liquid discharge control information.

6. The liquid discharging method according to claim 5, wherein the generating of the liquid discharge control information includes generating a correction look up table by correcting a look up table which converts the recording image information into liquid discharge control information, which corresponds to the recording image information, based on the coloring information, and converting the recording image information into the liquid discharge control information according to the correction look up table.

7. The liquid discharging method according to claim 5, wherein the generating of the liquid discharge control information includes generating correction recording image information by correcting the recording image information based on the coloring information, and generating the liquid discharge control information based on the correction recording image information.

8. The liquid discharging method according to claim 5, wherein the generating of the liquid discharge control information includes correcting the liquid discharge control information which corresponds to the recording image information based on the coloring information.

* * * * *